United States Patent
Batchelder et al.

(10) Patent No.: US 6,351,767 B1
(45) Date of Patent: Feb. 26, 2002

(54) METHOD AND SYSTEM FOR AUTOMATICALLY CACHING DYNAMIC CONTENT BASED ON A CACHEABILITY DETERMINATION

(75) Inventors: Edward M. Batchelder, Brookline; John T. Chamberlain, Medford; Andrew J. Wharton, Arlington; Charles E. Dumont, Pepperell, all of MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,135

(22) Filed: Jan. 25, 1999

(51) Int. Cl.[7] .............................................. G06F 15/16
(52) U.S. Cl. ..................... 709/219; 709/202; 709/213; 711/118
(58) Field of Search ............................... 707/200, 203, 707/513; 711/118; 709/203, 219, 216, 213, 202

(56) References Cited

U.S. PATENT DOCUMENTS

| | | | | |
|---|---|---|---|---|
| 5,787,470 A | * | 7/1998 | DeSimone et al. | 711/124 |
| 5,873,100 A | * | 2/1999 | Adams et al. | 707/204 |
| 5,933,849 A | * | 8/1999 | Srbljic et al. | 711/118 |
| 6,006,242 A | * | 12/1999 | Poole et al. | 707/531 |
| 6,016,512 A | * | 1/2000 | Huitema | 709/245 |
| 6,032,182 A | * | 2/2000 | Mullen-Schultz | 709/223 |
| 6,128,624 A | * | 10/2000 | Papierniak et al. | 707/104 |
| 6,128,655 A | * | 10/2000 | Fields et al. | 709/219 |
| 6,157,930 A | * | 12/2000 | Ballard et al. | 707/203 |
| 6,185,608 B1 | * | 2/2001 | Hon et al. | 709/216 |
| 6,192,382 B1 | * | 2/2001 | Lafer et al. | 707/513 |

\* cited by examiner

Primary Examiner—Krisna Lim
(74) Attorney, Agent, or Firm—Mintz Levin Cohn Ferris Glovsky and Popeo P.C.

(57) ABSTRACT

A caching system and method are disclosed that allow for the caching of web pages that have dynamic content. The caching system and method utilize a cacheability analyzer that analyzes responses based on time, content, user identification, and macro hierarchy. The caching system only caches those responses having dynamic content that are deemed cacheable. The method for caching dynamic content includes identifying parts of a response to a request for dynamic content from a requestor and attributes associated with the parts. The attributes are examined to determine cacheability of the response. A cacheability is made based on the determination and the response may be cached based upon that cacheability determination.

94 Claims, 10 Drawing Sheets

METHOD AND SYSTEM FOR AUTOMATICALLY CACHING DYNAMIC CONTENT BASED ON A CACHEABILITY DETERMINATION

COPENDING APPLICATION

This application is a co-pending application filed on an even date herewith and assigned U.S. patent application Ser. No. 09/236,723, entitled "CACHE OVERRIDE CONTROL IN A DYNAMIC CACHING APPARATUS." The subject matter of the above-identified co-pending patent application is incorporated herein by reference.

FIELD OF THE INVENTION

The present invention relates generally to data caching of web content on a network and, more specifically, to the caching of dynamic content in web pages in a web server.

BACKGROUND OF THE INVENTION

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

FIG. 1 shows a commonly used network arrangement in which a plurality of local computer systems 200 in a local area network (LAN) may access a plurality of remote servers 100 through the Internet. Each remote server may be a web server (such as a Domino™ web server, available from Lotus Development Corporation of Cambridge, Mass.) for providing a web site for access by local computer systems 200. Each web site normally further provides a plurality of web pages to be served to the local computer systems upon request. Each local computer system may access the remote web sites with web browser software.

The WWW is a collection of servers on an IP (Internet Protocol) network, such as the Internet, an Intranet or an Extranet, that utilize the Hypertext Transfer Protocol (HTTP). Hereinafter, "Internet" will be used to refer to any IP network. HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

On the server side, the first web servers were merely HTTP servers that resolved universal resource locators (URLs) by extracting literally from the URL the path to a file that contained the needed page, and transmitting the page back to the browser. Such a server was very simple; it could only be used to access static pages.

A "static" page is a page which, each time it is requested and served to a requestor, has the same byte content. That is, it does not matter which requestor is requesting the page, when the requester is requesting the page, etc., the byte content of that page remains the same. By contrast, a "dynamic page" is a page which has byte content that may change depending upon the particular requester, when the page is being requested, etc. This will be discussed further below.

It is important that web pages be served as quickly as possible, both to reduce the response time to a single user, and to increase the number of users that can be served concurrently. To improve the response time, caches are used by the Web server. Web server caches are used to store web page responses in a readily accessible memory location so that when the web page is requested by a user, the previously cached web page response can be retrieved from cache and served quickly to the user.

Caching web page responses by the web server works quite well for web page responses having static content, i.e., content that doesn't change frequently. An example of a static web page is one, at a company's web site, comprising a compilation of text and graphics objects describing that company's history.

In fact, classic web servers cache static pages quite effectively. Specifically, classic web servers serve web page responses, some of which are static, namely, responses comprising HTML from the file system. Each of the static responses has a modified date associated with it that is maintained by the file system. These pages are cached easily by the web server. The contents of the response and its associated modification date are simply stored in the cache. When a subsequent request is received by the server for that page, the server requests the latest modification date for that page from the file system and compares the latest modification date with the modification date associated with the cached response. If the latest modification date is the same as the modification date associated with the cached response, the cached response is served. If the latest modification date is later than the modification date associated with the cached response, the cached response is considered "stale" and a "fresh" response is retrieved and built by the web server for serving to the requesting user. The fresh response, along with its associated modification date, is cached to replace the stale response. This caching scheme saves the time that otherwise would have been spent to build requested pages which otherwise could have been cached using this classic caching scheme.

However, newer web servers provide not only static web pages but also dynamic web pages, i.e., a page having byte content that may change depending upon the particular requester, when the page is being requested, etc. Examples of dynamic web pages are pages containing content from a number of different sources or pages having computed content. For example, a page may contain macros that compute content for the page, i.e., the page has "computable content". These macros may change the page content each time the page is accessed. This makes it difficult to cache that page using the classic caching method described above. (Macros, or formulas as they are named in Lotus Notes software, are expressions that perform a function, such as determining field values, defining what documents appear in a view, or calculate values for a column. Lotus Notes is available from Lotus Development Corporation in Cambridge, Mass.)

Or, the page may contain information from a number of different sources, that information may or may not have associated modified dates making it difficult, if not impossible, to cache using the classic caching method. For example, the page may comprise a composite of a number of "parts" including: other documents, designs from databases, content from databases, the present user's identity, the current time, the current environment, etc. Some of these parts are actual entities in the system, e.g., documents, databases, etc. Some parts though are "virtual" and are used to model the effects of the execution of macros or scripts, e.g., the user's identity may be accessed via one of a number of @functions such as @UserName, @UserRoles, etc. in Lotus Notes software. ("@functions" are macros for performing specialized tasks in Lotus Notes formulas. They can be used to format text strings, generate dates and times, format dates and times, evaluate conditional statements, calculate numeric values, calculate values in a list, convert text to numbers or numbers to text, or activate agents, actions, buttons, or hotspots.) These various part types are computable parts and have correspondingly various types of attributes that can not be handled by the classic caching systems and methods of prior art.

Clearly, it is more difficult to use caching as a mechanism for improving user response time for pages with dynamic content. This problem for the server is twofold. First, after building a web page response, the server must determine whether the response that it is preparing to serve the requesting user is cacheable (i.e., determining its cacheability). Second, the server, upon receiving a request for a web page whose previous response has been cached, must determine whether the cached response is valid (i.e., determining its validity) and applicable (i.e., determining its applicability). For instance, web page responses containing macros that are time-dependent may not be cacheable at all. If a page includes a macro for providing the current time, then every access of the page is unique and the page cannot be cached in memory at all. Another example is where is a cached page is valid for serving to some users but not others. For instance, if the page includes a macro for the user's name, then the page can be cached for the user's private access, but not for use by others. (HTML representing a document is specific to a user if macros are dependent on user name or user roles. Using this user data, some data may be made visible based on which user is requesting it.)

The term "Dynamic HTML" (DHTML) needs to be explained in the context of the method and system of the present invention. "Dynamic" in DHTML is referring primarily to the effect that the code has on the web page appearance at the browser. For instance, the dynamic HTML may comprise scripts which run on the browser to change the appearance of the web page such as by displaying a button which, if pushed, displays additional text or graphics. The key distinction is that "dynamic" in the DHTML sense refers to the browser, not the server. From the server's point of view, a DHTML page may still be "static" in that the byte content is the same each time the page is requested. The content is not dependent on any thing, e.g., the properties of the request, such as the identity of the particular user, the time of day that the request is made, etc. "Dynamic" content, as used in the system and method of the present invention, refers to content that has such dependencies. As can be readily seen, using caching as a means for increasing server performance for responses which have dynamic content has a number of complications and difficulties which have not been overcome by any of the systems of the prior art. As such, HTML representing responses having dynamic content has not been cached in the past. Accordingly, system and method to cache content that can include dynamic content without suffering from the drawbacks discussed above is needed.

SUMMARY OF THE INVENTION

According to the present invention, a caching system and method utilized within a web server is disclosed that automatically caches web content, such as web pages, that has dynamic content. The caching system and method of the present invention is utilized within a web server which receives requests for web pages and, based upon those requests, serves web page responses that were previously cached or, if those cached responses are either inapplicable or invalid, the server builds a new response and serves it to the requester. The caching system performs two critical functions: first, it determines the cacheability of built responses and caches those responses it deems cacheable and second, if a cached response appears appropriate for a particular web page request, the caching system examines the cached response to determine whether the cached response is applicable for the particular request and whether the cached response is still valid. Each response is comprised of a plurality of parts, some of the parts being dynamic in nature. The parts have associated attributes that, either explicitly or implicitly, characterize the nature of the parts. The caching system comprises an attribute analyzer that creates a composite set of attributes, the composite representing the characteristics of the response. The caching system further comprises a cacheability analyzer that analyzes the attribute composite set and determines the cacheability of the response. The server then caches the response based upon that determination. Examples of attributes utilized for determining cacheability include the time variance setting of the dynamic content, the user's identity, or the location of the content.

The caching system further comprises a cached-response analyzer for analyzing the cached responses prior to serving to a requesting user. The cached-response analyzer comprises an applicability analyzer (for determining the applicability of the cached response to the particular request) and a validity analyzer (for determining the validity of the cached response). If the cached response passes the tests performed by these analyzers it is served to the requesting user.

The method steps may also be implemented in program code for modifying a computer system to cache information that has dynamic content.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE PREFERRED EMBODIMENT

Figure 1:
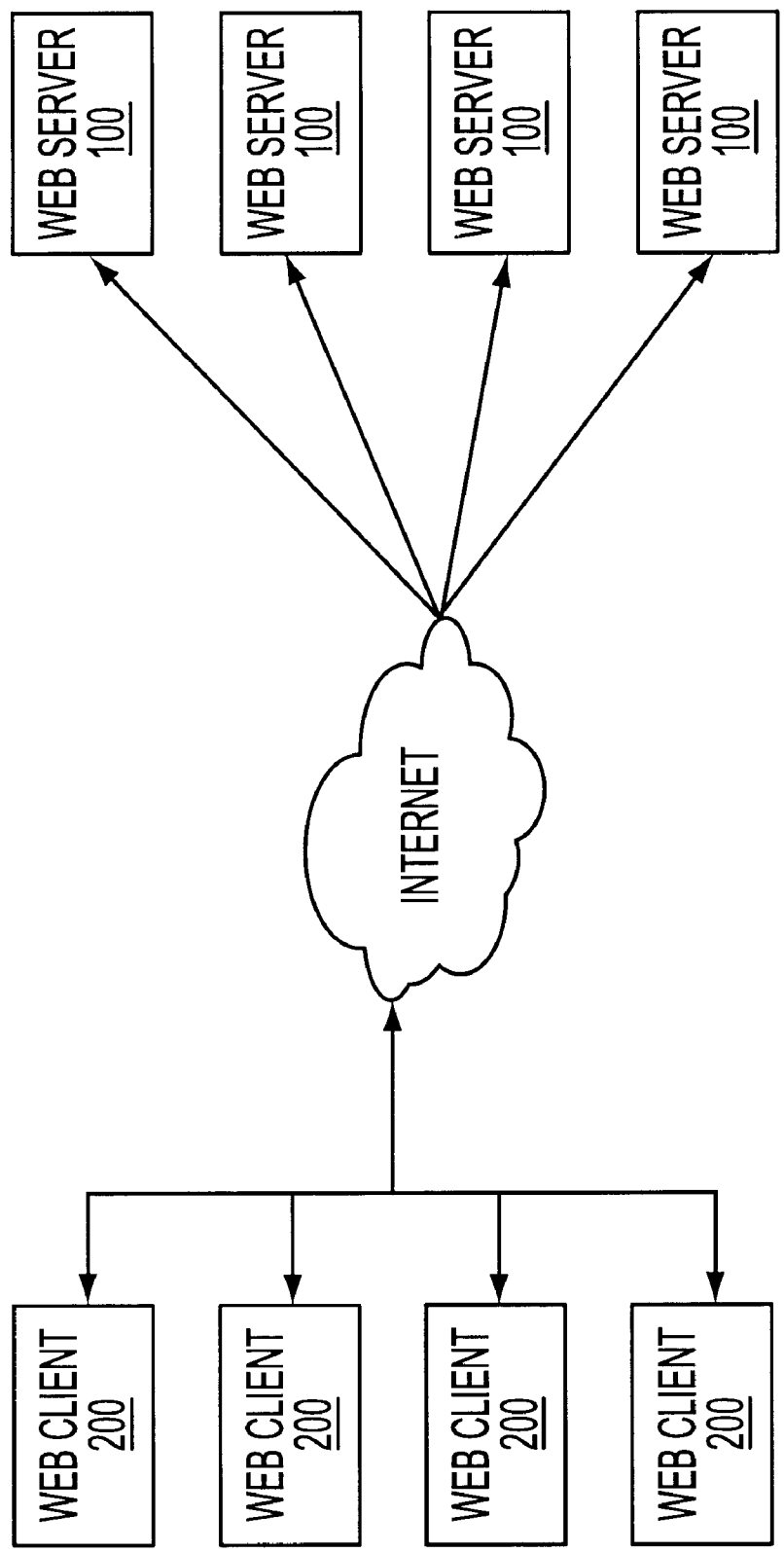
FIG. 1 is a block diagram of a generic network configuration that may be used with the disclosed system.
Figure 2:
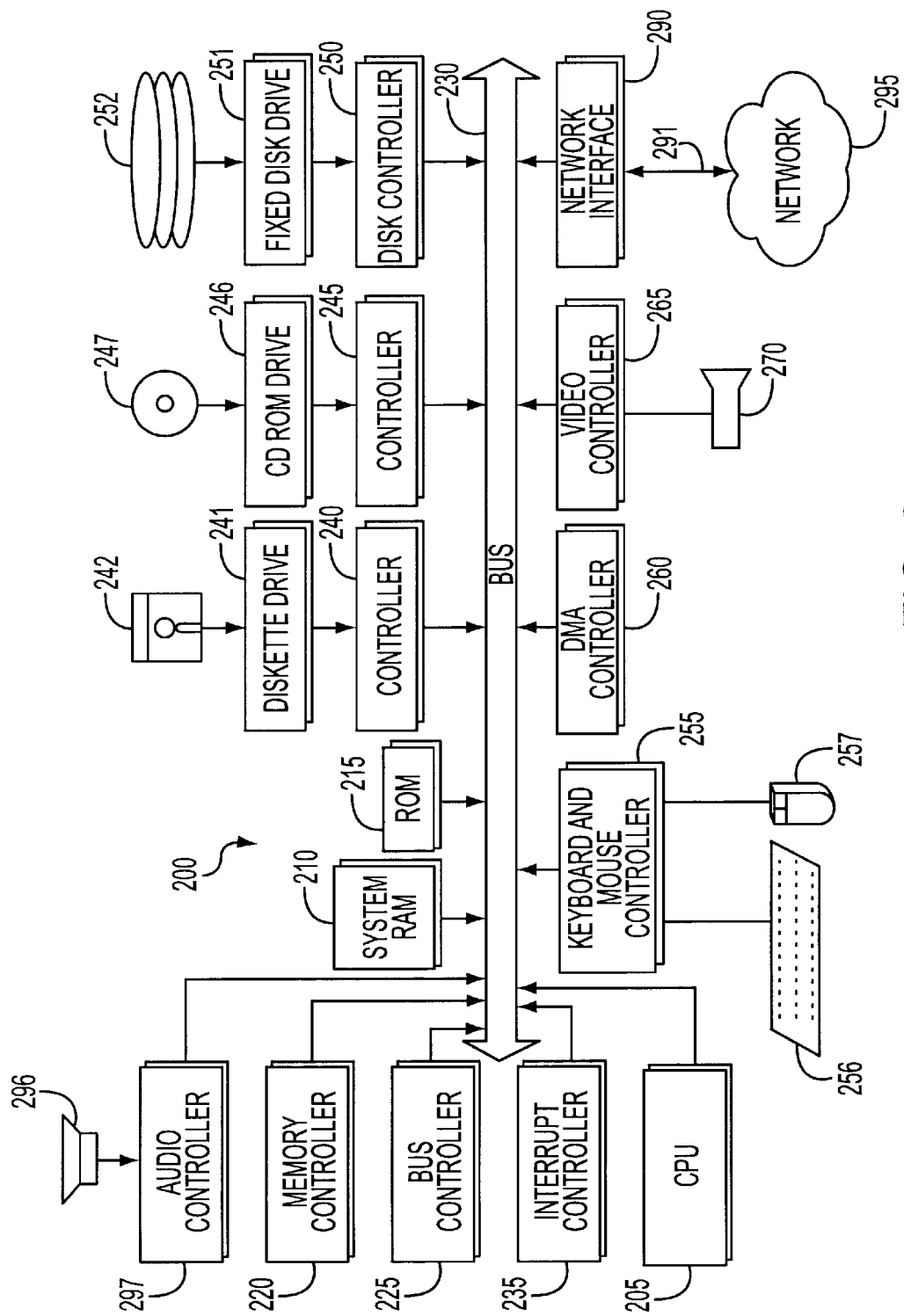
FIG. 2 is a block diagram of a web server system.

FIG. 2 illustrates the system architecture for an exemplary server 100 or client computer 200, such as an IBM THINKPAD 701® computer or like computer, on which the disclosed network access system can be implemented. The exemplary computer system of FIG. 2 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 2.

The server 100 includes a central processing unit (CPU) 205, which may include a conventional microprocessor, random access memory (RAM) 210 for temporary storage of information, and read only memory (ROM) 215 for permanent storage of information. A memory controller 220 is provided for controlling system RAM 210. A bus controller 225 is provided for controlling bus 230, and an interrupt controller 235 is used for receiving and processing various interrupt signals from the other system components.

Diskette 242, CD-ROM 247, or hard disk 252 may provide mass storage. Data and software may be exchanged with server 100 via removable media, such as diskette 242 and CD-ROM 247. Diskette 242 is inserted into diskette drive 241, which is connected to bus 230 by controller 240. Similarly, CD-ROM 247 can be inserted into CD-ROM drive 246, which is connected to bus 230 by controller 245. CD-ROM 247 can also have digital versatile disc (DVD) playback capabilities as well. Finally, the hard disk 252 is part of a fixed disk drive 251, which is connected to bus 230 by controller 250.

User input to the server computer 100 may be provided by a number of devices. For example, a keyboard 256 and a mouse 257 may be connected to bus 230 by keyboard and mouse controller 255. An audio transducer 296, which may act as both a microphone and a speaker, is connected to bus 230 by audio controller 297. It should be obvious to those reasonably skilled in the art that other input devices, such as a pen and/or tablet and a microphone for voice input, may be connected to server computer 100 through bus 230 and an appropriate controller. DMA controller 260 is provided for performing direct memory access to system RAM 210. A visual display is generated by a video controller 265, which controls video display 270.

Server computer 100 also includes a network adapter 290 that allows the server computer 100 to be interconnected to a network 295 via a bus 291. The network 295, which may be a local area network (LAN), a wide area network (WAN), or the Internet, may utilize general-purpose communication lines that interconnect a plurality of network devices.

The Web server 100 answers URL (Universal Resource Locator) requests by sending back pages of data encoded in Hyper Text Markup Language (HTML). It also handles URL requests and HTML forms that trigger executable programs according to the Common Gateway Interface (CGI) specification. The Web server 100 includes code that manages both inbound and outbound HTTP (Hyper Text Transfer Protocol) communications. In these respects, the Web server 100 performs like any other HTTP server, responding in the standard way to standard URL requests.

The preferred embodiment will be discussed primarily in terms of a Lotus Domino web server although the system and method of the present invention may be implemented in any web server.

Figure 3:
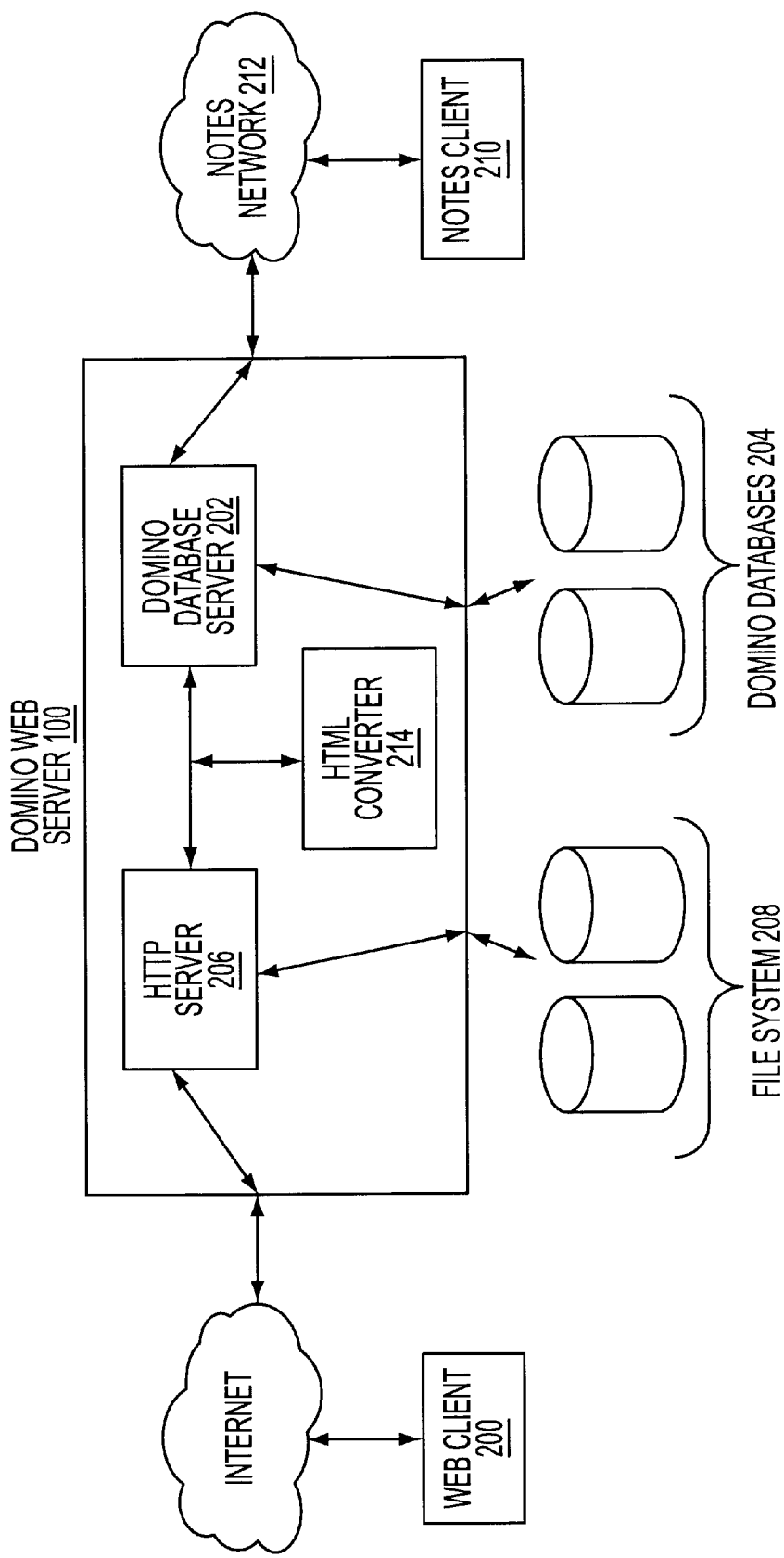
FIG. 3 is a high-level block diagram of a Lotus Domino web server.

As a matter of background, as can be seen in its most basic form in FIG. 3, a Domino web server 100 is a server having many tasks running on it simultaneously. Among the server tasks are the Domino™ database server tasks 202, i.e., serving up documents from Domino databases 204, and the HTTP server tasks 206, i.e., serving up documents having formats such as HTML, GIF, JPEG, XML, DHTML, BMP, MPEG, WAV, Java applets, and other file formats known to those skilled in the art from file system 208.

Notes software, available from Lotus Development Corporation, works with Domino to provide a distributed client/server database application to let users organize, process, track, and use information to suit their individual needs. Notes/Domino consolidate the tools needed to effectively communicate and collaborate in an organization by providing, inter alia, email, group discussion, workflow, scheduling, document management and many other functions. Domino databases are built on three basic concepts: documents, views and forms. Documents are collections of data items that can be retrieved as a set. Views are the ways of accessing the indices or summaries of documents stored in a database while forms are templates for accessing and displaying documents.

When a Notes client 210 requests access to a Domino database 204 via the Notes network 212, the Domino database server task 202 provides access. When a web client 200 requests an HTML document, the HTTP server task 206 provides it. When a web client 200 requests a Notes document, the HTTP server task 206 passes the request through to the Domino database server task 202. If access is granted, the Domino database server 202 retrieves the requested document and passes it to an HTML converter 214 which converts the Notes views, documents, and forms from Notes format to HTML format, then delivers the resulting HTML pages to the HTTP server 206 for serving to the web client. If a web client submits a form or query, the HTTP server task 206 passes the form to the HTML Converter 214 which converts the form to Notes format and passes it to the Domino database server 202 for appropriate processing.

Figure 4:
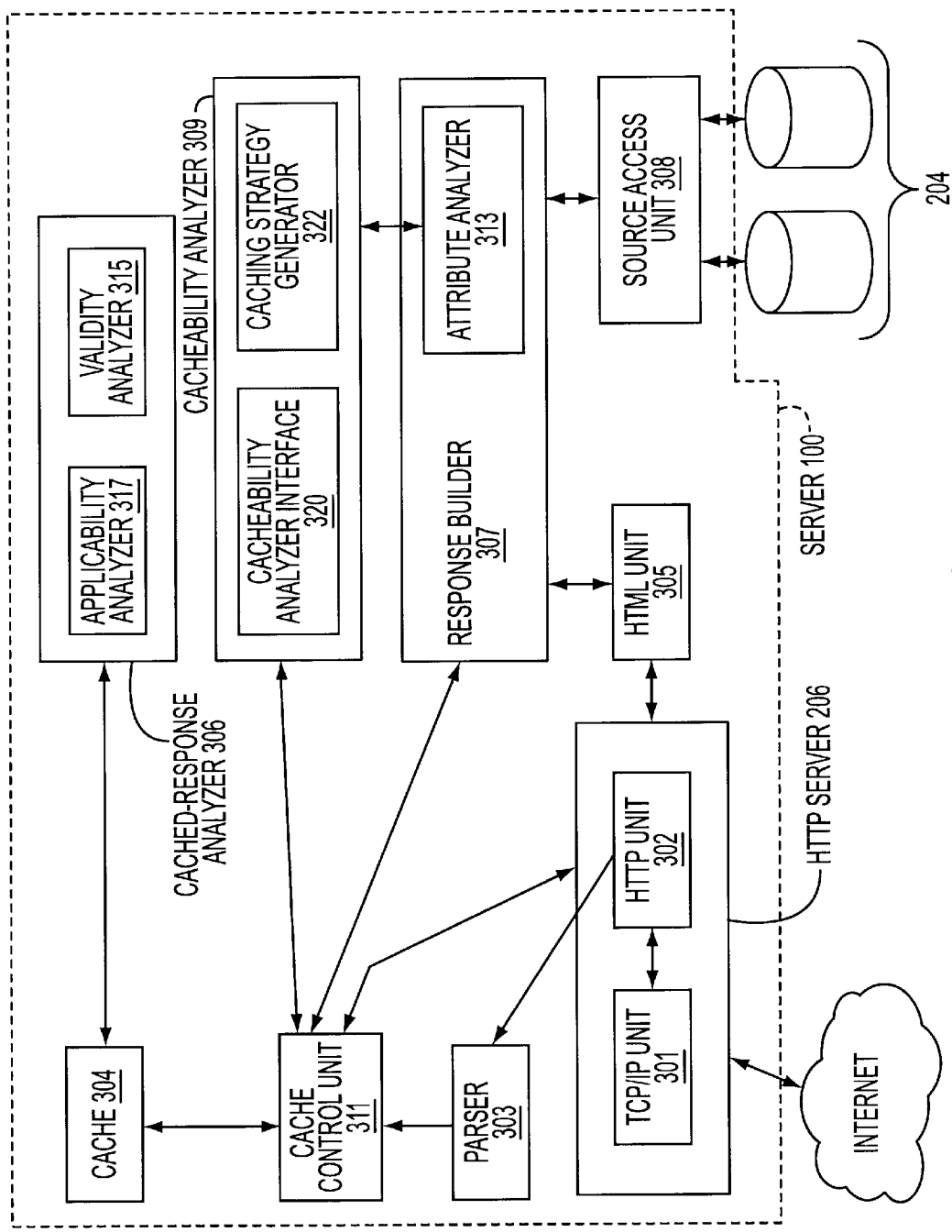
FIG. 4 is a block diagram of a web server system having the caching system of the present invention.

FIG. 4 illustrates the server caching system in greater detail. As shown in FIG. 4, the web server 100 may be connected to a number of Domino sources 204. However, the sources may comprise any number of different types of elements, other than Domino databases: other databases, files, other web sites, etc, but Domino sources are shown for clarity. The web server may also be connected to HTML databases 208 as was discussed above. The web server 100 comprises many functional units. It comprises the HTTP server 206, discussed above, which comprises a TCP/IP application 301, and a HyperText Transfer Protocol (HTTP) unit 302. The web server 100 further comprises the HTML converter unit 214 discussed above. It further comprises a parser 303 (for parsing received URLs), a cache 304, cache control unit 311, a cached-response analyzer 306, a response builder 307, a source access unit 308 (or Domino database server 202) and a cacheability analyzer 309.

These units operate as follows: TCP/IP unit 301 and HTTP unit 302 act together as the interface to the Internet by implementing the TCP/IP and HTTP protocols for server 100. TCP/IP unit 301 utilizes the TCP/IP protocol for conveying and receiving information to and from the Internet. HTTP unit 302 implements HTTP, which is the standard on which the Web operates. These two units provide the full-service interface to the Web.

When server 100 receives a URL from a client, the HTTP server 206 passes the URL to the URL Parser 303, which breaks the URL into different parts. The parsed URL is passed to the cache control unit 311. With a Domino server, within the URL that is received from the requesting user is a Domino/Notes-specific command, which indicates what action is being requested. The following are examples of server specific commands within the URL that may be received by the Domino server:

?OpenDatabase—command for opening a database;
?OpenView—command for opening a view;
?OpenDocument—command for opening a document;
?OpenForm—command for opening a form;
?ReadForm—command for reading a form; and
?EditDocument—command for editing a document.

While, in this example, each of these commands has a "?" in front of the command as syntax that the server can use to identify the string as a command, the server can identify other syntaxes as well. These commands require a response to be sent to the requesting user. The requested response may have already been cached and it may be valid and applicable. For those URLs having commands requesting a possibly-cached response (i.e., ?OpenDatabase, ?OpenView, ?OpenDocument, ?OpenForm, and ?ReadForm), the cache control 311 examines the request against previously cached responses to determine whether any of the previously cached responses is appropriate for the request. It does this by comparing the parsed URL against the URLs of the previously cached responses in the cache 304. If there is not an exact match or if the URL doesn't have "cacheable" commands (e.g., ?EditDocument), the parsed URL is passed to the response builder 307. The response builder 307 uses the parsed URL to build the response by accessing the appropriate sources (via source access unit 308) and retrieving the appropriate "parts" to construct the response. The parts retrieved by the response builder 307 may comprise many different types, including data, forms, subforms, database design elements, calculations, etc. In other words, there is no theoretical restriction as to the type of parts comprising a web page response. These parts each have their own attributes. For instance, some parts may or may not have last modified dates associated with the part. This will be discussed in greater detail below. The attributes of all of the parts used to build the response are collected and analyzed by attribute analyzer 313. The attribute analyzer 313 builds a "composite" of the attributes, the attribute composite being representative of the entire response.

Once the web page response is built by the response builder 307, it is passed to the HTML unit 305 for conversion to HTML. This HTML response is then passed to the HTTP server 206 for serving to the requesting user.

At the same time, the attribute analyzer 313 passes the composite of the parts attributes to the cacheability analyzer 309 for determining the cacheability of the built response. The cacheability analyzer 309 examines the attribute composite and, if it determines that the response cannot be cached, the response is not cached. If it determines that the response can be cached, it provides an indication to the cache control unit 311, along with the response and an associated set of cache strategy indicators generated by the cacheability analyzer 309. These indicators are used by the cached-response analyzer discussed below. The cacheability analyzer 309 comprises a cacheability analyzer interface 320 and a caching strategy generator 322. The cacheability analyzer interface 320 acts as an interface for the cacheability analyzer 309 while the caching strategy generator 322 examines the attribute composite and creates a caching strategy.

If the cache control unit determines that there is an exact match between the parsed URL of the user request and the URLs corresponding to one of the cached responses in the cache 304, the cached response along with its associated cache strategy indicators is passed to the cached response analyzer 306. The response analyzer 306 performs two series of tests. The first series of tests are response-specific and the second series of tests are request-specific. The response-specific tests are performed by the validity analyzer portion 315 while the request-specific tests are performed by the applicability analyzer portion 317. These tests will be discussed in greater detail below. If the cached response and its associated attributes pass the two tests, the cached response is simply served up to the user via the HTTP server 206.

Determining how to make an accurate and timely decision as to which Web pages are cacheable is important in any caching system. Prior caching systems considered the presence of macros, among others, too volatile, and thus, did not consider any pages with macros, for example, as candidates for caching. Unfortunately, this meant that many Web pages could not take advantage of caching and the performance gains that it provides. The caching system of the present invention improves performance in the server 100 by providing the ability to cache Web pages that contain macros and other dynamic content.

As mentioned above, each of the parts that comprise a response has attributes, which provide information about that particular part. These attributes can provide information about the part's identity and last modification date, as examples. This type of information is valuable to the caching system of the present invention because it can be used to determine the cacheability, the applicability and the validity of the response or subsequently cached response. During the response building process of the response builder 307, the attribute analyzer 313 collects the attributes of the parts used in building the response. The attribute analyzer 313 creates a composite of the attributes of the parts of the response so that the response has a composite of attributes representative of the entire response. The attribute composite set is passed to the cacheability analyzer 309. The cacheability analyzer 309 uses this to determine a caching strategy. Specifically, the cacheability analyzer 309 examines the attribute composite and creates caching strategy flags which are used by the system for caching as will be discussed in greater detail.

As was noted above, each "part" of the response may have one or more attributes. If the part is an @function, the following list corresponds each @function with its associated attribute(s) that are set at compute time. The attribute Depends means that the evaluation of the @function will determine the attribute. If the @function says "Fallback", that means that there is an evaluation that is Web server-specific and this is the non-Web version. Its converse is "Web."

@Accessed—OffDatabase, UsedDocId
@Certificate—OffDatabase
@Command-Web—Depends
@Command([Compose])—Depends, DbDesign, OffDatabase
@Command([FileSave])—HadEffect
@Created—UsedDocId
@DbColumn-Fallback—UserVariant, DbDesign, DbData, Unknown, Depends, OffDatabase
@DbCommand-Fallback—Unknown
@DbCommand-Web—Depends
@DbLookup-Fallback—Depends, Unknown, DbData, DbDesign, UserVariant, OffDatabase
@DbManager—DbDesign
@DbTitle—DbDesign
@DocumentUniqueID—UsedDocId
@Environment—HadEffect, UsedEnvironment
@GetDocField—DbData, UserVariant
@GetPortsList—UsedEnvironment
@GetProfileField—DbData, UserVariant
@InheritedDocumentUniqueID—UsedDocId
@MailEncryptSavedPreference-Fallback—UsedEnvironment
@MailEncryptSentPreference-Fallback—UsedEnvironment
@MailSavePreference-Fallback—UsedEnvironment
@MailSend-Failback—HadEffect
@MailSignPreference-Fallback—UsedEnvironment
@Modified—UsedDocId
@NoteID—UsedDocId
@Now—TimeVariant
@PostedCommand-Web—Depends
@Random—OffDatabase
@Responses—DbData
@SetDocField—HadEffect, UserVariant
@SetProfileField—HadEffect, UserVariant
@TextToTime—TimeVariant
@Today—TimeVariant
@Tomorrow—TimeVariant
@Unique—None, Depends, OffDatabase
@URLGetHeader-Fallback—OffDatabase
@URLOpen-Fallback—OffDatabase, HadEffect
@UserAccess-Web—OffDatabase, UserVariant, DbDesign
@UserName—UserVariant
@UserPrivileges—DbDesign, UserVariant
@UserRoles-Fallback—DbDesign, UserVariant
@UserRoles-Web—DbDesign, UserVariant
@V3UserName—UserVariant
@ViewTitle—DbDesign
@Yesterday—TimeVariant
@Zone—TimeVariant The attribute composite used for characterizing the response for cacheability comprises the following attributes described below:

OffDb—The response uses data outside the current database. This includes the use of CGI variables.

TimeVariant (CacheUntil)—If the TimeVariant attribute bit is set, the response uses time-variant data (such as @Now which generates the current time and date). The CacheUntil parameter indicates the time/date after which the part is stale.

HadEffect—The response has an important side-effect (such as @SetDocField which modifies data in a Domino database).

UsedEnv—The response uses the server environment (as found in the NOTES.INI file). This does not include CGI variables.

UserVariant—The response is dependent on the user's identity. This includes using any data or design note that includes Read ACLs (Access Control Lists), Readers fields, Authors fields or controlled access sections.

DesignUserVariant—The response is from a database that has protected design elements.

DbData—The response uses data in the database other than the referenced document. This includes all views, embedded views in forms, and so on.

UsedDocId—The response uses the document's ID.

UsedNewDoc—The response uses a newly-created in-memory note.

Unknown—The response does something that couldn't be analyzed (such as executed in another programming language, such as LotusScript).

Error—The response generated an error of some sort.

This attribute composite is passed to the cacheability analyzer 309. It should be noted that this is the composite set of attributes for the response. The parts of the response contribute to this set by contributing to none, some or all of these attributes. The creation of the attribute composite set follows a conservative approach, i.e., if one part has an attribute indicating that the part cannot be cached, the composite will indicate that the response cannot be cached.

A number of caching strategy flags are generated by the cacheability analyzer 309 based upon the response attribute composite and are discussed below. It should be noted that this is a limited set of flags and other flags could be generated as well and the system of the present invention is not so limited. The flags are:

DontCache—Don't cache the response at all.

Document—Invalidate the cached response when the document changes.

DbDesign—Invalidate the cached response when the database design changes.

DbData—Invalidate the cached response when any of the data in the database changes.

OnlyAnonymous—Cache the response, but only serve it when the user is anonymous.

Figure 5A:
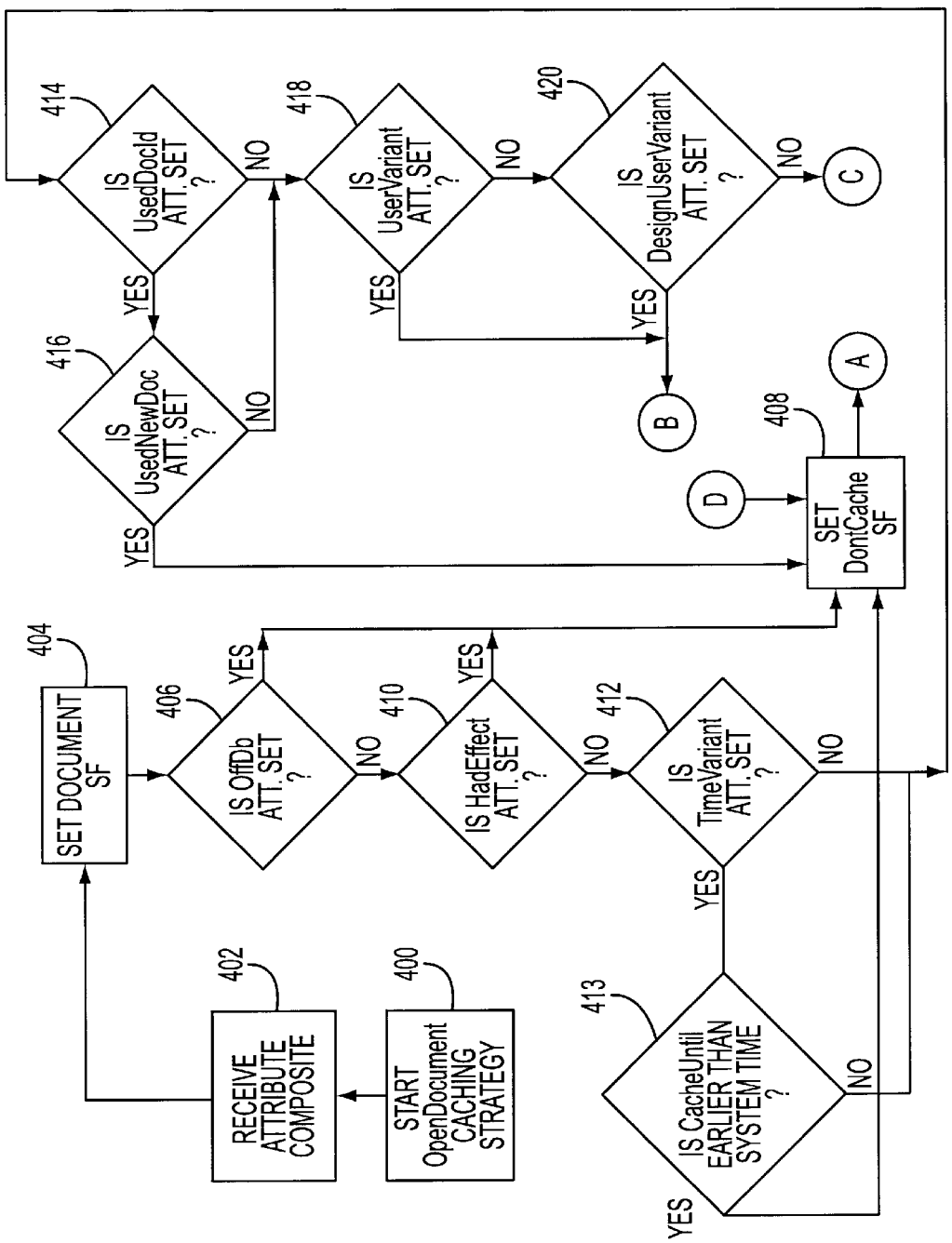
FIG. 5 (consisting of FIGS. 5a and 5b) is a flow chart of the method steps for determining the caching strategy when a document is being opened by a user.
Figure 5B:
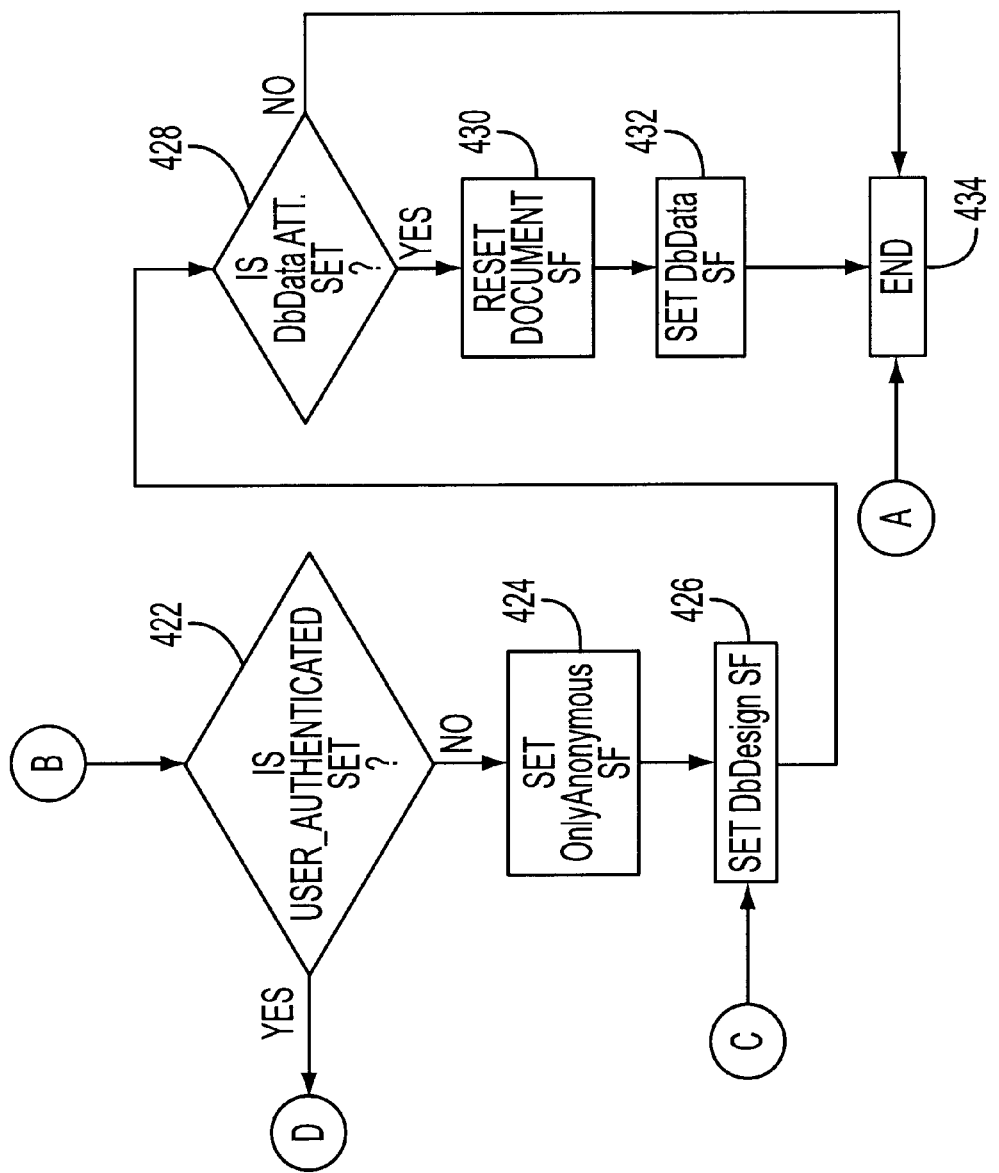

FIG. 5 (comprising FIGS. 5a and 5b) is a flow chart that illustrates the method used by the cacheability analyzer 309 to create the caching strategy flags associated with each of the built responses. This is the caching strategy used when the ?OpenDocument command is in the URL. Other caching strategies may be used when other commands are received from the user. At 400, the caching strategy procedure for an ?OpenDocument command begins. At 402, the attribute composite is received by the cacheability analyzer 309 (via cacheability analyzer interface 320 and is passed to caching strategy generator 322) from the attribute analyzer 313. At 404, in the caching strategy generator 322, the Document strategy flag is set. (For purposes of clarity, "to set" when used in conjunction with the state of a particular flag means to change it to "1", or positive state, while "to reset" means to change it to "0", or negative state.) At 406, the OffDb attribute is examined. If it is set, the DontCache strategy flag is set at 408. After the DontCache strategy flag is set at 408, the procedure goes to "A" shown on FIG. 5b. At "A", the procedure is finished at 434.) At 406, if the OffDb attribute is not set, the HadEffect attribute is examined at 410. If it is set, the DontCache strategy flag is set at 408 and the procedure continues to "A" as discussed above.) At 410, if the HadEffect attribute is not set, the TimeVariant attribute is examined at 412. If it is set, the CacheUntil parameter (which accompanies the TimeVariant attribute) is examined at 413. The CacheUntil parameter is in time/date units indicating the time/date after which the part (or response) is stale. This parameter is especially useful for the retrieval portion of this system to be discussed below. If the Cache-Until parameter is earlier than the then-present system time/date, the DontCache strategy flag is set at 408 and the procedure continues to "A" as discussed above. At 413, if the CacheUntil parameter is later than the then-present system time/date or, at 413, the TimeVariant attribute is not set, the UsedDocId attribute is examined at 414. If it is set, the UsedNewDoc attribute is examined at 416. If it is set (i.e., both the UsedDocid and UsedNewDoc attributes are set), the DontCache strategy flag is set at 408 and the procedure continues to "A" as discussed above. If either the UsedDocId or the UsedNewDoc attribute is not set, the UserVariant attribute is examined at 418. If it is not set, the DesignUserVariant attribute is examined at 420. If it is not set, the procedure continues at "C" to be discussed below. If either the UserVariant attribute at 418 or the DesignUserVariant attribute at 420 is set, the procedure continues at "B" in FIG. 5b.

At "B" in FIG. 5b, the cacheability analyzer 309 determines whether the USER_AUTHENTICATED bit is set at 422. The USER_AUTHENTICATED bit, which is a property of the request that is determined during the initial processing of the request, indicates that the user was authenticated by the server. If the user was not authenticated and was still allowed to access the server data, the user is logged on as "Anonymous". There are many reasons why a server may be designed to authenticate a user. One reason may be that the authenticated user is allowed to access areas of the web site not accessible to non-authenticated users. Another may be that the authenticated user is allowed to enter information in databases where a non-authenticated user is not. In any event, the USER_AUTHENTICATED bit is passed to the cacheability analyzer 309 along with the attribute composite.

If USER_AUTHENTICATED bit is set, the DontCache strategy flag is set at 408 and the procedure continues to "A" as discussed above. If it is not set, the OnlyAnonymous strategy flag is set at 424. At 426 and at "C", the DbDesign strategy flag is set. At 428, the DbData attribute is examined. If it is not set, the procedure ends at 434. If it is set, the Document strategy flag is reset at 430. The DbData strategy flag is then set at 432. The procedure then ends at 434.

FIGS. 5a and 5b and corresponding discussion relates only to the cacheability strategy procedure when the request is an ?OpenDocument request. If the request includes another command instead, such as ?OpenView, the cacheability procedure may be different. However, this procedure is exemplary of cacheability procedures for other commands.

Another point is that the CacheUntil parameter was discussed only in terms of the TimeVariant attribute for an @function. The CacheUntil parameter could be used to characterize the part, irrespective if the part generated time/date data as the @functions having the TimeVariant attribute. It could be used to indicate a future time/date that the part was expected to change, after which the cached response having that part should be re-built.

The caching strategy flags that are generated by the caching strategy generator 322 are passed to the cacheability analyzer interface 320. The cacheability analyzer interface 320 examines the flags to determine whether the built response should be cached in cache 304. Concurrently, the built response is sent to the HTML unit 214 and to the HTTP server 206. The HTTP server 206 serves the built response in HTML format to the user (without the strategy flags).

Figure 6:
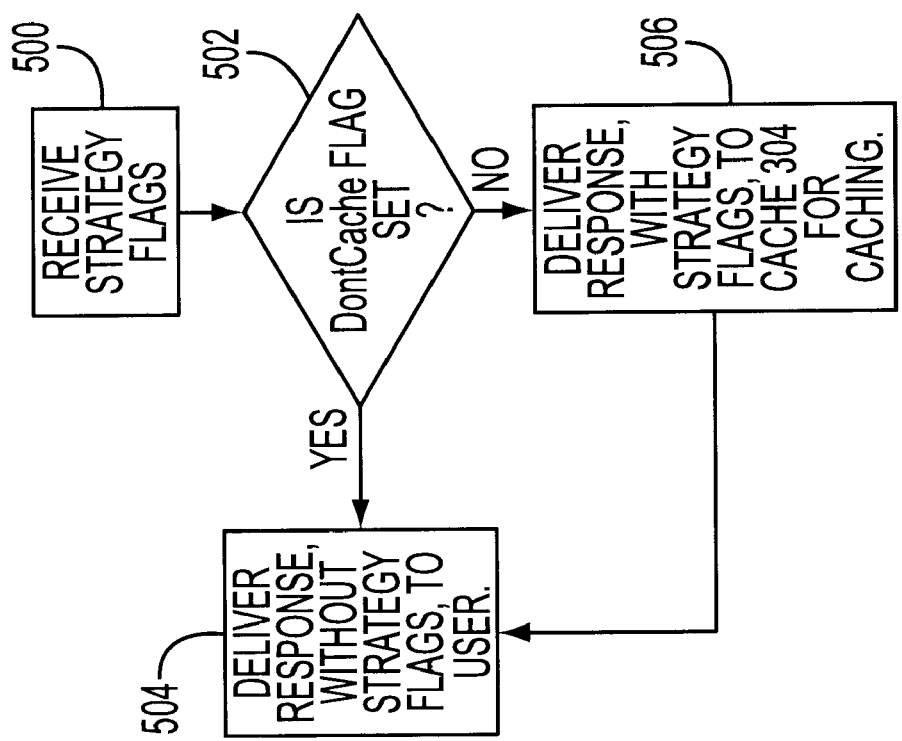
FIG. 6 illustrates a flow diagram of the method steps for implementing the caching scheme according to the present invention.

FIG. 6 is a flow chart illustrating the method implemented in the cacheability analyzer interface 320. At 500, the cacheability analyzer interface 320 receives the caching strategy flags from the caching strategy generator 322. At 502, the DontCache flag is examined. If it is set, the response without the strategy flags is served to the HTTP server 206 without being cached at 504. If it is not set, the response (after it has been converted to HTML), along with the strategy flags and with some other parameters (such as last_modified_date, CacheUntil) etc.), is sent to the cache 304 for caching at 506. The response is also served back to the user.

After a response is cached, it remains in the cache until it is either removed or replaced. A cached response is normally replaced after it becomes known that one of the source parts has been modified at the source. This is sometimes known as the cached response becoming "stale". Normally, a cached response is identified as stale when its URL is requested by a user and the cache control unit compares the cached response's last modified date against the all of the source parts' last modified dates as discussed above.

A cached response may be removed for any number of reasons defined by the cache designer. Many times, the cache control unit 311 comprises a cache manager which utilizes a cache management utility for managing the cache. The cache manager may, for example, remove from cache those cached responses that have a predetermined life span which has expired (e.g., a response may have a CacheUntil parameter associated with it) or those cached responses that have least frequently been accessed (when the cache is getting full, for instance).

In any event, after a request is received, the request is examined by cache control unit 311 and the previously-cached responses are analyzed to determine whether any of the cached responses are candidates for serving to the request. A cached response is a candidate is it is appropriate to the request. Specifically, the received URL is parsed, examined for a suitable command request, e.g., "?OpenDocument", and compared against the cached response URLs. A matching URL cached entry is analyzed by the cached-response analyzer 306 as discussed above. Specifically, the caching strategy flags which were stored along with the cached response are analyzed for applicability (via the applicability analyzer 317) and for validity (via the validity analyzer 315). FIG. 7 is a flow chart illustrating both the applicability analysis method and the validity analysis method of a cached response.

Figure 7A:
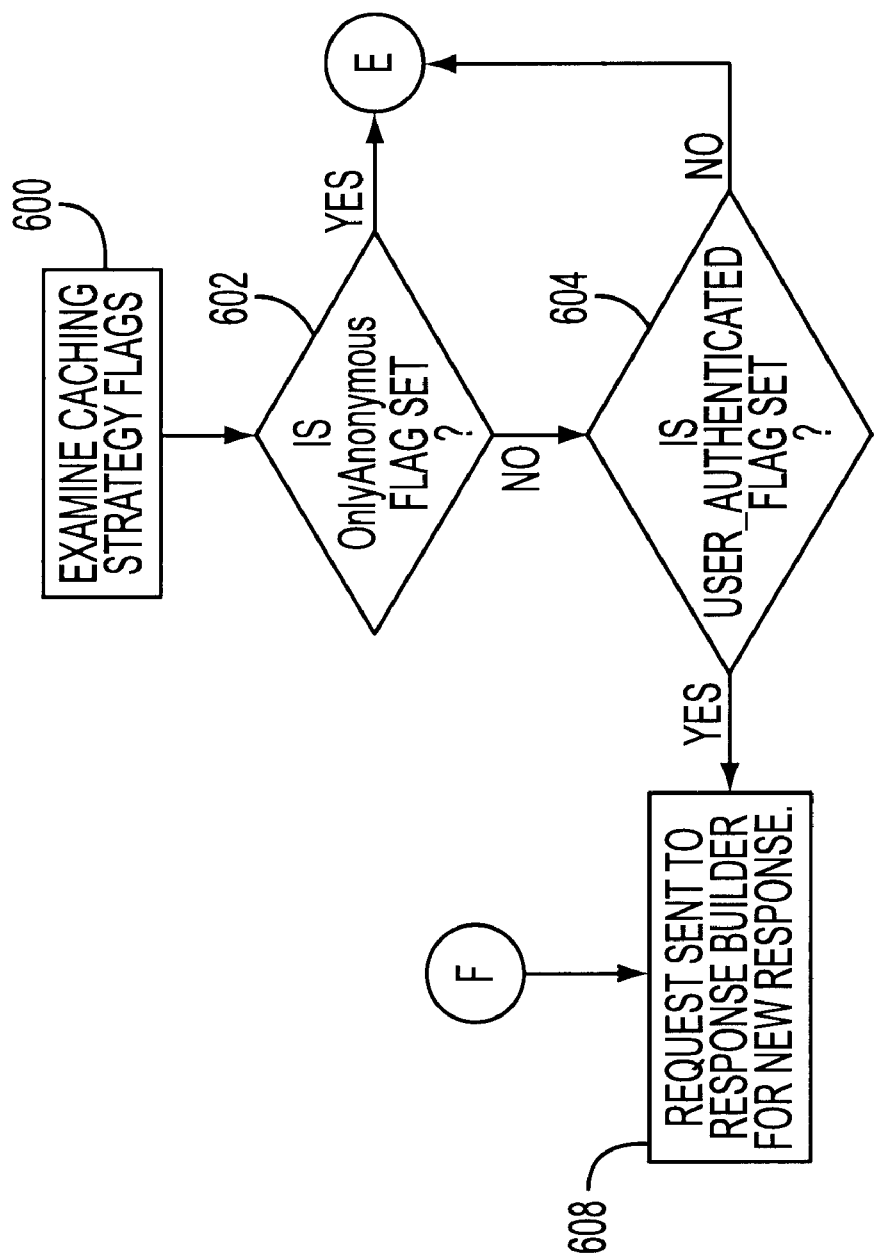
FIG. 7 (consisting of FIGS. 7a, 7b and 7c) is a flow chart illustrating the method steps for determining the applicability and validity of a cached response.
Figure 7B:
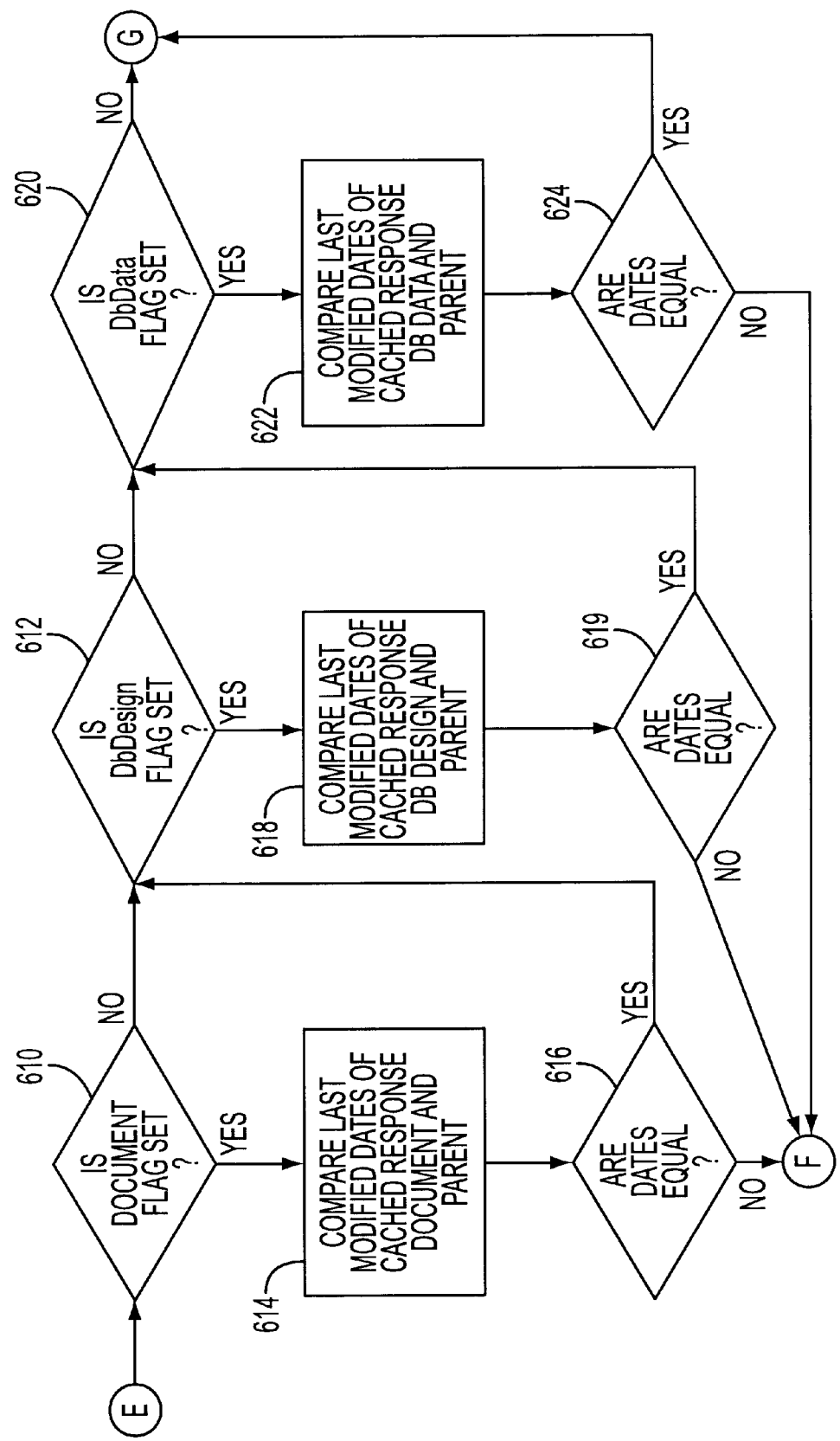
Figure 7C:
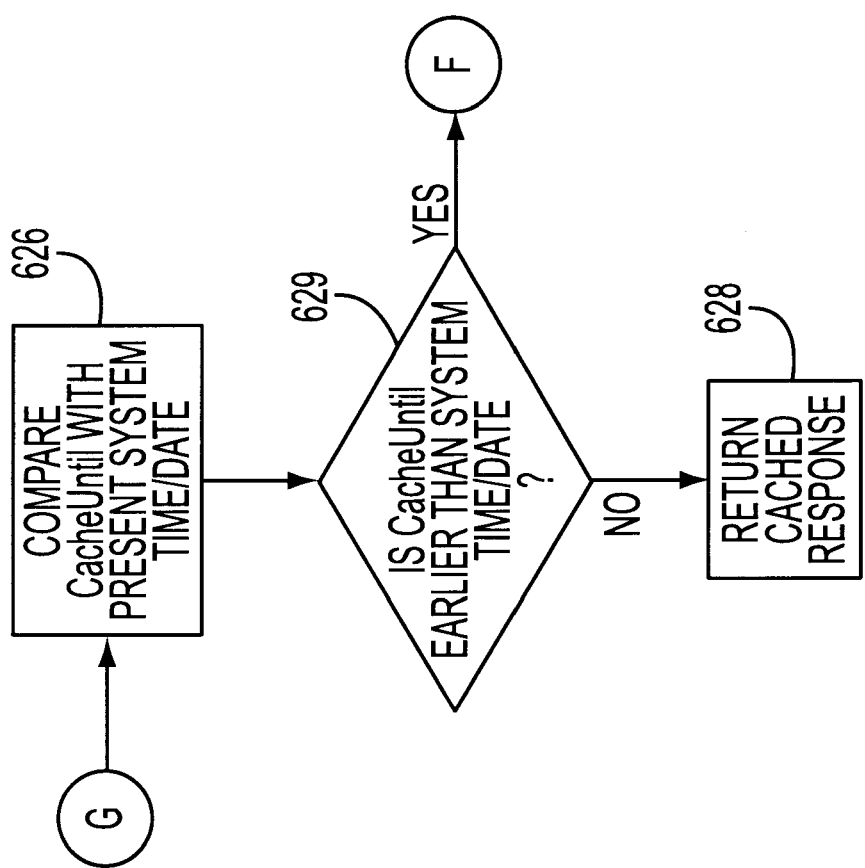

FIG. 7 consists of FIGS. 7a, 7b and 7c. FIG. 7a lays out the applicability analysis procedure while 7b and 7c depict the procedure followed for the validity analysis. In FIG. 7a, at 600, the caching strategy flags are examined by the applicability analyzer 317. At 602, the OnlyAnonymous strategy flag is examined. If it is not set, the applicability procedure is successfully completed at "E", so that the validity analysis procedure may begin. If it is set, at 604, the USER_AUTHENTICATED bit for the current request is examined. If the USER_AUTHENTICATED bit is not set, the applicability procedure is successfully completed at "E", so that the validity analysis procedure may begin. If it is set, the applicability procedure is completed at 608 but has failed. After a failed completion of the applicability procedure, there is no need to continue with the validity analysis as the cached response is not returned to the user. At 608, a request is made to the response builder 307 to build a new response based upon the requested URL.

The applicability analysis portion of the cached-response analysis only examined, as an example, one strategy flag (OnlyAnonymous). However, there are other request-specific characteristics that could as easily be tested. Tests for appropriate browser type and version, and tests for the appropriate language are examples of other user-specific tests that may be run against a cached response to ensure that it is applicable to the request or the requesting user.

In FIGS. 7b and 7c, the validity analysis begins at "E". At 610, the Document strategy flag is examined. If it is not set, the procedure moves to 612. If it is set, the last modified date of the candidate cached response document is compared against the last modified date of the source document at 614. If the last modified dates are not equal, the candidate response is "stale" and the procedure moves to "F" which continues at 608. If the dates are equal, at 612, the DbDesign strategy flag is examined. If it is not set, the procedure moves to 620. If it is set, the last modified date of the candidate cached response database is compared against the last modified date of the source database design at 618. If the last modified dates are not the same at 619, the candidate response is "stale" and the procedure moves to "F" which continues at 608. If the dates are the same, at 620, the DbData strategy flag is examined. If it is not set, the procedure moves to "G" which continues at 626. If it is set, the last modified date of the candidate cached response is compared against the last modified date of any of the data in the source database design at 622. If the last modified dates are not the same at 624, the candidate response is "stale" and the procedure moves to "F" which continues at 608. If they are the same, at "G" which continues at 626, the CacheUntil date is examined. If it is earlier than the present system time/date, the response is "stale" and the procedure moves to "F" which continues at 608. If it is equal to or later than the present system time/date, at 626, the candidate cached response is both applicable and valid and is returned to the HTTP server 206 for serving to the user.

It should be understood, however, that use of the hypertext server may be practiced with other types of remote documents, such as word processor or spread sheet documents. Accordingly, maintenance of a database is discussed here for exemplary purposes and is not intended to limit its scope. It also should be noted that although many embodiments of the system have been discussed with reference to World Wide Web pages, the system may be practiced with various other types of documents. Moreover, although a Lotus Domino web server environment is disclosed as the preferred embodiment, it should be understood that the disclosed system may be utilized with any known web server. The above discussion of Domino and Notes was exemplary only and therefore should not be considered a limitation of the caching system.

In an alternative embodiment, the system may be implemented as a computer program product for use with a computer system. Such implementation may include a series of computer instructions fixed either on a tangible medium, such as a computer readable media (e.g., diskette 242, CD-ROM 247, ROM 215, or fixed disk 252 as shown in FIG. 2) or transmittable to a computer system, via a modem or other interface device, such as communications adapter 290 connected to the network 295 over a medium 291. Medium 291 may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it will be apparent to those skilled in the art that various changes and modifications can be made that will achieve some of the advantages of the invention without departing from the true scope of the invention. These and other obvious modifications are intended to be covered by the appended claims.

Having thus described the invention, what we desire to claim and secure by Letters Patent is:

1. A system for caching which receives a request from a requester and builds, by collecting one or more parts from one or more sources, a response to that request, the response comprising a composite of the one or more parts, at least one of the parts comprising dynamic content, each part having one or more attributes characterizing the part, the attributes indicating the cacheability of the part, the system for caching the response comprising:
   an attribute analyzer for determining the attributes of the parts of the a response;
   cacheability analyzer for examining the attributes to determine cacheability of the response, wherein the attributes include at least one of a time variance setting of dynamic content, a user's identify, or a location of dynamic content, and making a cacheability determination based upon that examination; and
   means for caching the response based upon that cacheability determination.

2. The system of claim 1 wherein the dynamic content comprises a computable part.

3. The system of claim 1 wherein the attribute analyzer creates a composite set of attributes based upon the individual attributes of the individual parts, the composite attribute set providing a characterization of the cacheability of the response; and further wherein the cacheability analyzer examines the attribute composite set to determine the cacheability of the response.

4. The system of claim 1 wherein the cacheability analyzer creates a caching strategy comprising a plurality of flags.

5. The system of claim 4 wherein each request has one or more properties, wherein the cacheability analyzer creates a caching strategy comprising at least one flag indicating that the response is cacheable and at least one flag indicating that the applicability of the response for serving to subsequent requests is based upon the one or more properties of the subsequent request.

6. The system of claim 5 wherein one of the request properties is the identity of the requester, wherein the caching strategy comprises at least one flag indicating that the response is cacheable and at least one flag indicating that the applicability of the response for serving to subsequent requestors is based upon the subsequent requestor identity property.

7. The system of claim 5 wherein one or more of the request properties is the characteristics of the requestor's browser, wherein the caching strategy comprises at least one flag indicating that the response is cacheable and at least one flag indicating that the applicability of the response for serving to subsequent requesters is based upon the subsequent requester browser characteristic properties.

8. The system of claim 5 wherein one of the request properties is the requested language, wherein the caching strategy comprises at least one flag indicating that the response is cacheable and at least one flag indicating that the applicability of the response for serving to subsequent requests is based upon the requested language property of the subsequent request.

9. The system of claim 4 wherein the caching strategy comprises at least one flag indicating that the response is cacheable but its validity is based upon whether any of the parts on the one or more sources has been modified since the response has been cached.

10. The system of claim 1 wherein the cacheability analyzer analyzes the attributes to determine whether any of the attributes indicate that the response causes important side effects and makes a determination that the response is not cacheable if any of the attributes indicate that the response causes important side effects.

11. The system of claim 1 wherein the cacheability analyzer analyzes the attributes to determine whether any of the attributes indicate that the response uses time variant data and makes a determination that the response is only cacheable for a determined length of time if any of the attributes indicate that the response uses time variant data.

12. The system of claim 1 wherein the cacheability analyzer further comprises means for creating a caching strategy comprising a plurality of flags, and further wherein the means for caching caches the caching strategy flags along with the associated response.

13. In a system which receives a request from a requestor and dynamically builds, by collecting one or more parts from one or more sources, a response to that request, the response comprising a composite of the one or more parts, at least one of the parts comprising dynamic content, each part having one or more attributes characterizing the part, the attributes indicating the cacheability of the part, a method for caching the response comprising the steps of:
   a) identifying the parts of the response and their associated attributes, wherein the attributes include at least one of a time variance setting of dynamic content, a user's identify, or a location of dynamic content;
   b) examining the attributes to determine cacheability of the response; and
   c) making a cacheability determination based upon that examination; and
   d) caching the response based upon the cacheability determination.

14. The method of claim 13 wherein the dynamic content comprises a computable part.

15. The method of claim 13 further comprising, after step a, the step of:
   a1. creating a composite set of attributes based upon the individual attributes of the individual parts, the composite attribute set providing a characterization of the cacheability of the response; and
   in step b, examining the attribute composite set to determine cacheability of the response.

16. The method of claim 13 wherein, in step c, the cacheability determination comprises a plurality of flags.

17. The method of claim 16 wherein each request has one or more properties, wherein, in step c, the cacheability determination further comprises at least one flag indicating that the response is cacheable and further comprises at least one flag indicating that the applicability of the response for serving in response to a subsequent request is based upon the one or more properties of the subsequent request.

18. The method of claim 17 wherein one of the request properties is the identity of the requester, wherein the cacheability determination comprises at least one flag indicating that the response is cacheable and at least one flag indicating that the applicability of the response for serving to subsequent requesters is based upon the subsequent requester identity property.

19. The method of claim 17 wherein one or more of the request properties is the characteristics of the requestor's browser, wherein the cacheability determination comprises at least one flag indicating that the response is cacheable and at least one flag indicating that the applicability of the response for serving to subsequent requesters is based upon the subsequent requester browser characteristic properties.

20. The method of claim 17 wherein one of the request properties is the requested language, wherein the cacheability determination comprises at least one flag indicating that the response is cacheable and at least one flag indicating that the applicability of the response for serving in response to subsequent requests is based upon the requested language property of the subsequent request.

21. The method of claim 16 wherein the cacheability determination further comprises at least one flag indicating that the response is cacheable and at least one flag indicating that the validity of the response for serving to subsequent requests is based upon a determination of whether any of the parts on the one or more sources has been modified since the response was cached.

22. The method of claim 13 wherein step b further comprises analyzing the attributes to determine whether any of the attributes indicate that response causes important side effects and wherein step c further comprises making a determination that the response is not cacheable if any of the attributes indicate that response causes important side effects.

23. The method of claim 13 wherein step b further comprises analyzing the attributes to determine whether any of the attributes indicate that the response uses time variant data and wherein, in step c, the cacheability determination comprises at least one flag for indicating that the response is cacheable and is valid for serving to subsequent requests for a determined length if any of the attributes indicate that response uses time variant data.

24. The method of claim 13 wherein step c further comprises the step of creating a caching strategy comprising a plurality of flags, and further wherein step d caches the caching strategy flags along with the associated response.

25. A computer usable medium, for use in a computer which receives a request from a requestor and dynamically builds, by collecting one or more parts from one or more sources, a response to that request, the response comprising a composite of the one or more parts, at least one of the parts comprising dynamic content, each part having one or more attributes characterizing the part, the attributes indicating the cacheability of the part, the computer usable medium having computer readable program code embodied in the medium for causing the computer to perform method steps for caching the response comprising the method steps of:
   a) identifying the parts of the response and their associated attributes, wherein the attributes include at least one of a time variance setting of dynamic content, a user's identify, or a location of dynamic content;

b) examining the attributes to determine cacheability of the response; and c) making a cacheability determination based upon that examination;

d) caching the response based upon that cacheability determination.

26. The computer usable medium of claim 25 wherein the dynamic content comprises a computable part.

27. The computer usable medium of claim 25 further comprising, after step a, the step of:

a1. creating a composite set of attributes based upon the individual attributes of the individual parts, the composite attribute set providing a characterization of the cacheability of the response; and in step b, examining the attribute composite set to determine cacheability of the response.

28. The computer usable medium of claim 25 wherein, in step c, the cacheability determination comprises a plurality of flags.

29. The computer usable medium of claim 28 wherein each request has one or more properties, wherein, in step c, the cacheability determination further comprises at least one flag indicating that the response is cacheable and further comprises at least one flag indicating that the applicability of the response for serving in response to a subsequent request is based upon the one or more properties of the subsequent request.

30. The computer usable medium of claim 29 wherein one of the request properties is the identity of the requester, wherein the cacheability determination comprises at least one flag indicating that the response is cacheable and at least one flag indicating that the applicability of the response for serving to subsequent requesters is based upon the subsequent requester identity property.

31. The computer usable medium of claim 29 wherein one or more of the request properties is the characteristics of the requestor's browser, wherein the cacheability determination comprises at least one flag indicating that the response is cacheable and at least one flag indicating that the applicability of the response for serving to subsequent requesters is based upon the subsequent requestor browser characteristic properties.

32. The computer usable medium of claim 29 wherein one of the request properties is the requested language, wherein the cacheability determination comprises at least one flag indicating that the response is cacheable and at least one flag indicating that the applicability of the response for serving in response to subsequent requests is based upon the requested language property of the subsequent request.

33. The computer usable medium of claim 28 wherein the cacheability determination further comprises at least one flag indicating that the response is cacheable and at least one flag indicating that the validity of the response for serving to subsequent requests is based upon a determination of whether any of the parts on the one or more sources has been modified since the response was cached.

34. The computer usable medium of claim 25 wherein step b further comprises analyzing the attributes to determine whether any of the attributes indicate that response causes important side effects and wherein step c further comprises making a determination that the response is not cacheable if any of the attributes indicate that response causes important side effects.

35. The computer usable medium of claim 28 wherein step b further comprises analyzing the attributes to determine whether any of the attributes indicate that the response uses time variant data and wherein, in step c, the cacheability determination comprises at least one flag for indicating that the the response is cacheable and is valid for serving to subsequent requests for a determined length if any of the attributes indicate that response uses time variant data.

36. The computer usable medium of claim 25 wherein step c further comprises the step of creating a caching strategy comprising a plurality of flags, and further wherein step d caches the caching strategy flags along with the associated response.

37. In a system for receiving requests from requestors and serving responses to those requests, the system having a cache for holding previously served responses for serving to subsequent requests, at least some of the responses comprising dynamic content, a cached response retrieval system for retrieving a cached response comprising:

a cache control unit having means for receiving a request and means for determining whether the cache contains a candidate cached response appropriate for that request;

a cached response analyzer for analyzing the candidate cached response, the cached response analyzer determining the validity of the candidate cached response;

whereby the system serves the candidate cached response if the cached response analyzer determines that the candidate cached response is valid, wherein the validity of the candidate of the cache response is determined based on at least one of a time variance setting of dynamic content, a user's identity, and a location of dynamic content.

38. The cached response analyzer of claim 37 wherein the cached response analyzer has an applicability analyzer for determining the applicability of the candidate cached response for serving to the request.

39. The cached response analyzer of claim 38 wherein the request has request properties, one of the request properties being a language type, wherein the applicability analyzer determines whether the candidate cached response is applicable for serving to the request based upon the language type.

40. The cached response analyzer of claim 38 wherein the request has request properties, one of the request properties being a browser type, wherein the applicability analyzer determines whether the candidate cached response is applicable for serving to the request based upon the browser type.

41. The cached response analyzer of claim 38 wherein the request has request properties, one of the request properties being a requester identity, wherein the applicability analyzer determines whether the candidate cached response is applicable for serving to the request based upon the requestor identity.

42. The cached response analyzer of claim 38 wherein the candidate cached response comprises caching strategy flags, wherein the cached response analyzer has a validity analyzer, wherein the applicability analyzer analyzes the caching strategy flags related to the request and the validity analyzer analyzes the caching strategy flags related to the response.

43. The cached response analyzer of claim 37 wherein the system builds responses from parts from one or more sources, wherein the parts of each candidate cached response each has a last modified date, wherein the cached response analyzer has a validity analyzer for comparing the parts of the candidate cached response last modified dates to the last modified dates of the parts comprising the response on the one or more sources.

44. The cached response analyzer of claim 37 wherein the system has a present system time/date indicating the present time and date, wherein the candidate cached response comprises a "cache until" time/date, wherein the cached response analyzer has a validity analyzer, wherein the validity analyzer analyzes the "cache until" time/date against the present system time/date to determine whether the "cache until" time/date is earlier than the present system time/date.

45. For use in a system for receiving requests from requestors and serving responses to those requests, the system having a cache for holding previously served responses for serving to subsequent requests, at least some of the responses comprising dynamic content, a method for retrieving a cached response comprising the steps of:
   receiving a request;
   determining whether the cache contains a candidate cached response appropriate for that request;
   analyzing a candidate cached response; and
   determining the validity of the candidate cached response, whereby the system serves the candidate cached response if, during step d, candidate cached response is determined valid, wherein the validity of the candidate of the cache response is determined based on at least one of a time variance setting of dynamic content, a user's identity, and a location of dynamic content.

46. The method of claim 45 wherein step d further comprises the step d1 determining the applicability of the candidate cached response to the request.

47. The method of claim 46 wherein the request has request properties, one of the request properties being a language type, step d1 further comprises determining whether the candidate cached response is applicable for serving to the request based upon the language type.

48. The method of claim 46 wherein the request has request properties, one of the request properties being a browser type, step d1 further comprises determining whether the candidate cached response is applicable for serving to the request based upon the browser type.

49. The method of claim 46 wherein the request has request properties, one of the request properties being a requestor identity, step d1 further comprises determining whether the candidate cached response is applicable for serving to the request based upon the requestor identity.

50. The method of claim 46 wherein the candidate cached response comprises caching strategy flags, wherein step d further comprises analyzing the caching strategy flags related to the response for validity and wherein step d1 further comprises analyzing the caching strategy flags related to the request for applicability.

51. The method of claim 45 wherein the system builds responses from parts from one or more sources, wherein the parts of each candidate cached response each has a last modified date and step d further comprises comparing the parts of the candidate cached response last modified dates to the last modified dates of the parts comprising the response on the one or more sources.

52. The method of claim 45 wherein the system has a present system time/date indicating the present time and date, wherein the candidate cached response comprises a "cache until" time/date, wherein step d comprises analyzing the "cache until" time/date against the present system time/date to determine whether the "cache until" time/date is earlier than the present system time/date.

53. A computer usable medium for use in a computer for receiving requests from requesters and serving responses to those requests the computer having a cache for holding previously served responses for serving to subsequent requests, at least some of the responses comprising dynamic content, the computer usable medium having computer readable program code embodied in the medium for causing the computer to perform method steps for retrieving a cached response comprising the method steps of:
   a) receiving a request;
   b) determining whether the cache contains a candidate cached response 10 appropriate for that request;
   c) analyzing a candidate cached response;
   d) determining the validity of the candidate cached response, whereby the computer serves the candidate cached response if, during step d, the candidate cached response is determined valid, wherein the validity of the candidate of the cache response is determined based on at least one of a time variance setting of dynamic content, a user's identity, and a location of dynamic content; and
   e) determining the applicability of the candidate cached response to the requestor.

54. The computer usable medium of claim 53 wherein step d further comprises the step d1 determining the applicability of the candidate cached response to the request.

55. The computer usable medium of claim 54 wherein the request has request properties, one of the request properties being a language type, step d1 further comprises determining whether the candidate cached response is applicable for serving to the request based upon the language type.

56. The computer usable medium of claim 54 wherein the request has request properties, one of the request properties being a browser type, step d1 further comprises determining whether the candidate cached response is applicable for serving to the request based upon the browser type.

57. The computer usable medium of claim 54 wherein the request has request properties, one of the request properties being a requester identity, step d1 further comprises determining whether the candidate cached response is applicable for serving to the request based upon the requester identity.

58. The computer usable medium of claim 54 wherein the candidate cached response comprises caching strategy flags, wherein step d further comprises analyzing the caching strategy flags related to the response for validity and wherein step d1 further comprises analyzing the caching strategy flags related to the request for applicability.

59. The computer usable medium of claim 53 wherein the system builds responses from parts from one or more sources, wherein the parts of each candidate cached response each has a last modified date and step d further comprises comparing the parts of the candidate cached response last modified dates to the last modified dates of the parts comprising the response on the one or more sources.

60. The computer usable medium of claim 53 wherein the system has a present system time/date indicating the present time and date, wherein the candidate cached response comprises a "cache until" time/date, wherein step d comprises analyzing the "cache until" time/date against the present system time/date to determine whether the "cache until" time/date is earlier than the present system time/date.

61. A system which receives a request from a requestor and serves a response to that request, the response comprising a composite of the one or more parts, at least one of the parts comprising dynamic content, the system comprising:
   means for receiving a request from a requestor;
   a cache for holding previously served cached responses;
   a cache control unit for comparing the request against the cached response and for identifying a candidate cached response;
   a cached response analyzer for determining whether the candidate cached response should be served to the request;

a response builder for a building response;

a cacheability analyzer for analyzing the built response and determining its cacheability, wherein the cacheability is determined based on at least one of a time variance setting of dynamic content, a user's identity, and a location of dynamic content; means for caching, in the cache, the response based upon that cacheability determination; and means for serving the response or candidate cached response to the request.

62. The system of claim 61 wherein the cached response analyzer comprises an applicability analyzer for determining the applicability of the candidate cached response to the request and a validity analyzer for determining the validity of the candidate cached response;

whereby the serving means serves the candidate cached response if the cached response analyzer determines that the candidate cached response is both applicable and valid.

63. The system of claim 62 wherein the request has request properties, one of the request properties being a requester identity, wherein the applicability analyzer determines whether the candidate cached response is applicable for serving to the request based upon the requester identity.

64. The system of claim 62 wherein the response builder builds responses from parts from one or more sources, wherein the parts of each candidate cached response each has a last modified date, wherein the cached response analyzer has a validity analyzer for comparing the parts of the candidate cached response last modified dates to the last modified dates of the parts comprising the response on the one or more sources.

65. The system of claim 61 wherein cached response comprises caching strategy flags, wherein the cached response analyzer comprises an applicability analyzer for analyzing the caching strategy flags related to the request and a validity analyzer for analyzing the caching strategy flags related to the response.

66. The system of claim 61 wherein each part has one or more attributes characterizing the part, the attributes indicating the cacheability of the part, wherein the response builder comprises an attribute analyzer for creating a composite set of attributes based upon the individual attributes of the individual parts, the composite attribute set providing a characterization of the cacheability of the response; and further wherein the cacheability analyzer examines the attribute composite set to determine cacheability of the response.

67. The system of claim 61 wherein the cacheability analyzer creates a caching strategy comprising a plurality of flags.

68. The system of claim 67 wherein each request has one or more properties, wherein the caching strategy comprises at least one flag indicating that the response is cacheable and at least one flag indicating that the applicability of the response for serving to subsequent requests is based upon the one or more properties of the subsequent request.

69. The system of claim 67 wherein the caching strategy comprises at least one flag indicating that the response is cacheable but its validity is based upon whether any of the parts on the one or more sources has been modified since the response has been cached.

70. The system of claim 61 wherein the cacheability analyzer analyzes the attributes to determine whether any of the attributes indicate that the response causes important side effects and makes a determination that the response is not cacheable if any of the attributes indicate that the response causes important side effects.

71. The system of claim 61 wherein the cacheability analyzer analyzes the attributes to determine whether any of the attributes indicate that the response uses time variant data and makes a determination that the response is only cacheable for a determined length of time if any of the attributes indicate that the response uses time variant data.

72. The system of claim 61 wherein the cacheability analyzer further comprises means for creating a caching strategy comprising a plurality of flags, and further wherein the means for caching caches the caching strategy flags along with the associated response.

73. A method for use in a system which receives a request from a requestor and serves a response to that request, the response comprising a composite of the one or more parts, at least one of the parts comprising dynamic content, the system having a cache for holding previously served cached responses, each of the cached responses having an address, the method comprising the steps of:

a) receiving a request from a requestor;

b) comparing the request against the cached response and for identifying a candidate cached response;

c) determining whether the candidate cached response should be served to the request;

d) if so, serving the cached response;

e) if not, building a new response to the request;

f) analyzing the built response and determining its cacheability, wherein the cacheability is determined based on at least one of a time variance setting of dynamic content, a user's identity, and a location of dynamic content;

g) caching, in the cache, the response based upon that cacheability determination; and h) serving the response or candidate cached response to the request.

74. The method of claim 73 wherein step c further comprises determining the applicability of the candidate cached response to the request and determining the validity of the candidate cached response and step d further comprises serving the candidate cached response if the candidate cached response is both applicable and valid.

75. The method of claim 74 wherein the request has request properties, one of the request properties being a requestor identity, wherein the applicability analyzing step comprises determining whether the candidate cached response is applicable for serving to the request based upon the requester identity.

76. The method of claim 73 wherein the one or more parts are from one or more sources and wherein the parts of each candidate cached response each has a last modified date, wherein step c further comprises comparing the parts of each candidate cached response last modified dates to the last modified dates of the parts comprising response on the one or more sources.

77. The method of claim 73 wherein each part has one or more attributes characterizing the part, the attributes indicating the cacheability of the part, wherein step e further comprises the step of creating a composite set of attributes based upon the individual attributes of the individual parts, the composite attribute set providing a characterization of the cacheability of the response; and further wherein step f comprises the step of examining the attribute composite set to determine cacheability of the response.

78. The method of claim 73 wherein step f further comprises creating a caching strategy comprising a plurality of flags.

79. The method of claim 78 wherein each request has one or more properties, wherein the caching strategy comprises at least one flag indicating that the response is cacheable and at least one flag indicating that the applicability of the response for serving to subsequent requests is based upon the one or more properties of the subsequent request.

80. The method of claim 77 wherein the caching strategy comprises at least one flag indicating that the response is cacheable and its validity is based upon whether any of the parts on the one or more sources has been modified since the response has been cached.

81. The method of claim 77 wherein step f further comprises the steps of analyzing the attributes to determine whether any of the attributes indicate that the response causes important side effects and making a determination that the response is not cacheable if any of the attributes indicate that the response causes important side effects.

82. The method of claim 73 wherein step f further comprises the steps of analyzing the attributes to determine whether any of the attributes indicate that the response uses time variant data and making a determination that the response is only cacheable for a determined length of time if any of the attributes indicate that response uses time variant data.

83. The method of claim 77 wherein step g comprises caching the caching strategy flags along with the associated response.

84. A computer usable medium for use in a computer which receives a request from a requester and serves a response to that request, the response comprising a composite of the one or more parts, at least one of the parts comprising dynamic content, the computer having a cache for holding previously served cached responses, each of the cached responses having an address, the computer usable medium having computer readable program code embodied in the medium for causing the computer to perform method steps of:

a) receiving a request from a requestor;

b) comparing the request against the cached response and for identifying a candidate cached response;

c) determining whether the candidate cached response should be served to the request;

d) if so, serving the cached response;

e) if not, building a new response to the request;

f) analyzing the built response and determining its cacheability, wherein the cacheability is determined based on at least one of a time variance setting of dynamic content, a user's identity, and a location of dynamic content;

g) caching, in the cache, the response based upon that cacheability determination; and h) serving the response or candidate cached response to the request.

85. The computer usable medium of claim 84 wherein step c further comprises determining the applicability of the candidate cached response to the requestor and determining the validity of the candidate cached response and step d further comprises serving the candidate cached response if the candidate cached response is both applicable and valid.

86. The computer usable medium of claim 84 wherein the request has request properties, one of the request properties being a requestor identity, wherein the applicability analyzing step comprises determining whether the candidate cached response is applicable for serving to the request based upon the requestor identity.

87. The computer usable medium of claim 83 wherein the one or more parts are from one or more sources and wherein the parts of each candidate cached response each has a last modified date, wherein step c further comprises comparing the parts of each candidate cached response last modified dates to the last modified dates of the parts comprising the response on the one or more sources.

88. The computer usable medium of claim 84 wherein each part has one or more attributes characterizing the part, the attributes indicating the cacheability of the part, wherein step e further comprises the step of creating a composite set of attributes based upon the individual attributes of the individual parts, the composite attribute set providing a characterization of the cacheability of the response; and further wherein step f comprises the step of examining the attribute composite set to determine cacheability of the response.

89. The computer usable medium of claim 84 wherein step f further comprises creating a caching strategy comprising a plurality flags.

90. The computer usable medium of claim 89 wherein each request has one or more properties, wherein the caching strategy comprises at least one flag indicating that the response is cacheable and at least one flag indicating that the applicability of the response for serving to subsequent requests is based upon the one or more properties of the subsequent request.

91. The computer usable medium of claim 89 wherein the caching strategy comprises at least one flag indicating that the response is cacheable and its validity is based upon whether any of the parts on the one or more sources has been modified since the response has been cached.

92. The computer usable medium of claim 84 wherein step f further comprises the steps of analyzing the attributes to determine whether any of the attributes indicate that the response causes important side effects and making a determination that the response is not cacheable if any of the attributes indicate that the response causes important side effects.

93. The computer usable medium of claim 84 wherein step f further comprises the steps of analyzing the attributes to determine whether any of the attributes indicate that response uses time variant data and making a determination that the response is only cacheable for a determined length of time if any of the attributes indicate that response uses time variant data.

94. The computer usable medium of claim 89 wherein step g comprises caching the caching strategy flags along with the associated response.

* * * * *